July 14, 1936.  W. L. BROOKINS ET AL  2,047,306
BUTT WELDING
Filed June 30, 1930  4 Sheets-Sheet 3

William L. Brookins,
Homer W. Jones,
INVENTORS,

Byrnes Townsend
F. Potter,
BY

ATTORNEYS.

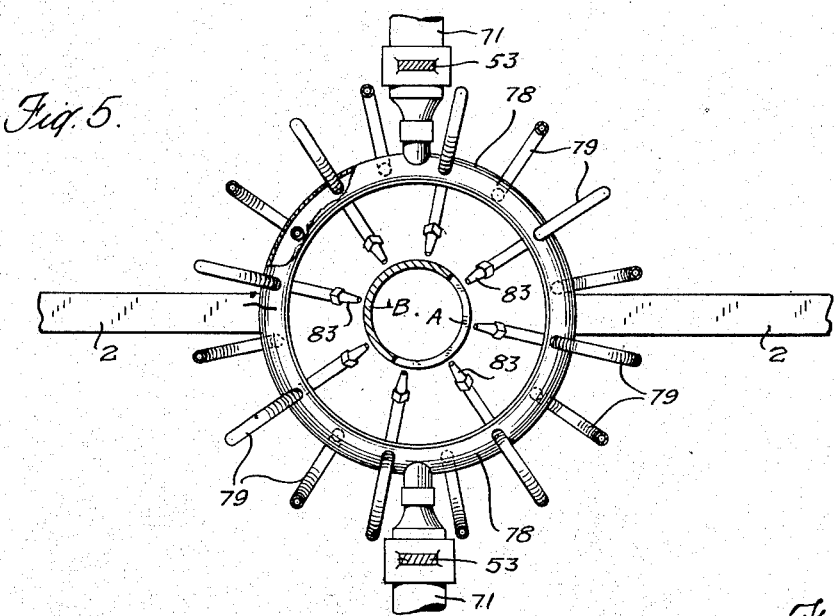
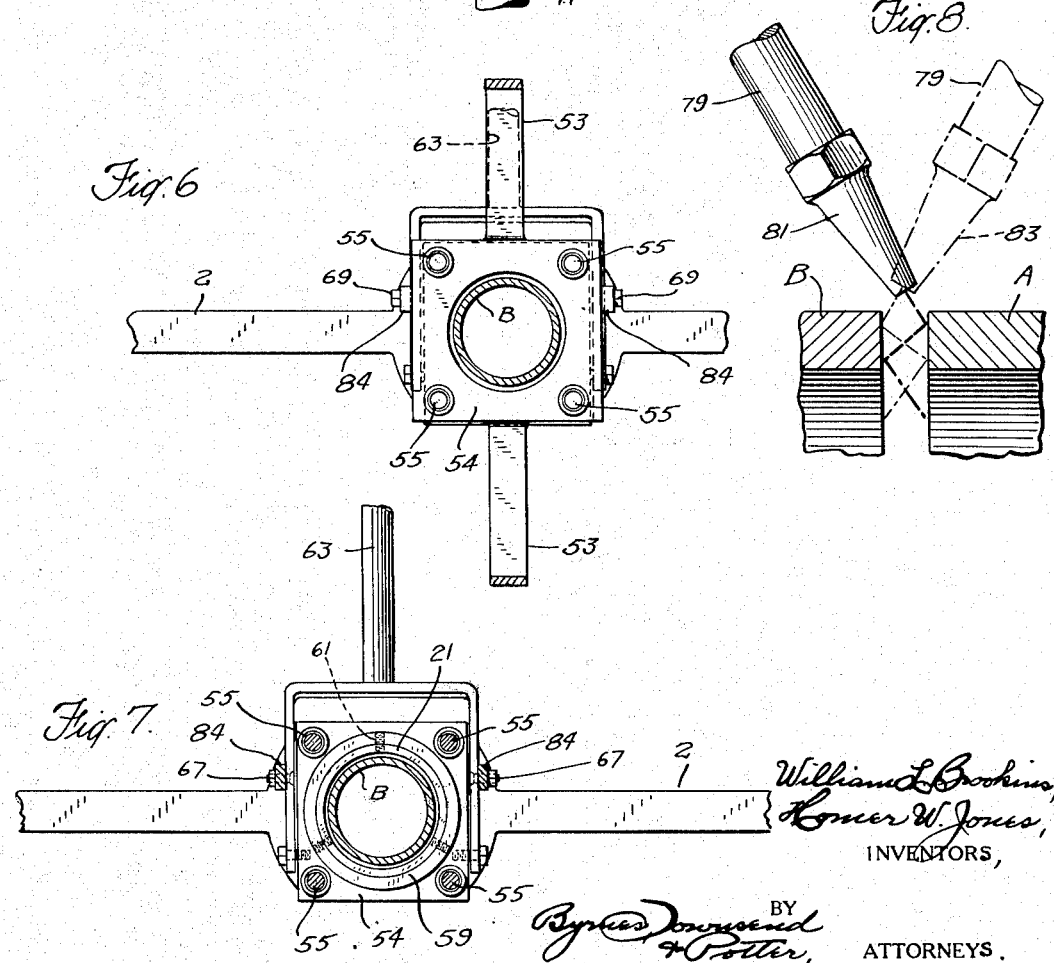

Patented July 14, 1936

2,047,306

UNITED STATES PATENT OFFICE 2,047,306

BUTT WELDING

William L. Brookins, Buffalo, and Homer W. Jones, Williamsville, N. Y., assignors, by mesne assignments, to Union Carbide and Carbon Corporation, a corporation of New York Application June 30, 1930, Serial No. 465,008

21 Claims. (Cl. 78—85)

The invention relates to machines which may be used for butt welding objects by heating the portions to be joined and then forcibly jamming or impacting the heated portions together at a high velocity. Heating by means of the oxy-acetylene flame is preferred but other means of heating may be used.

Figure 1:
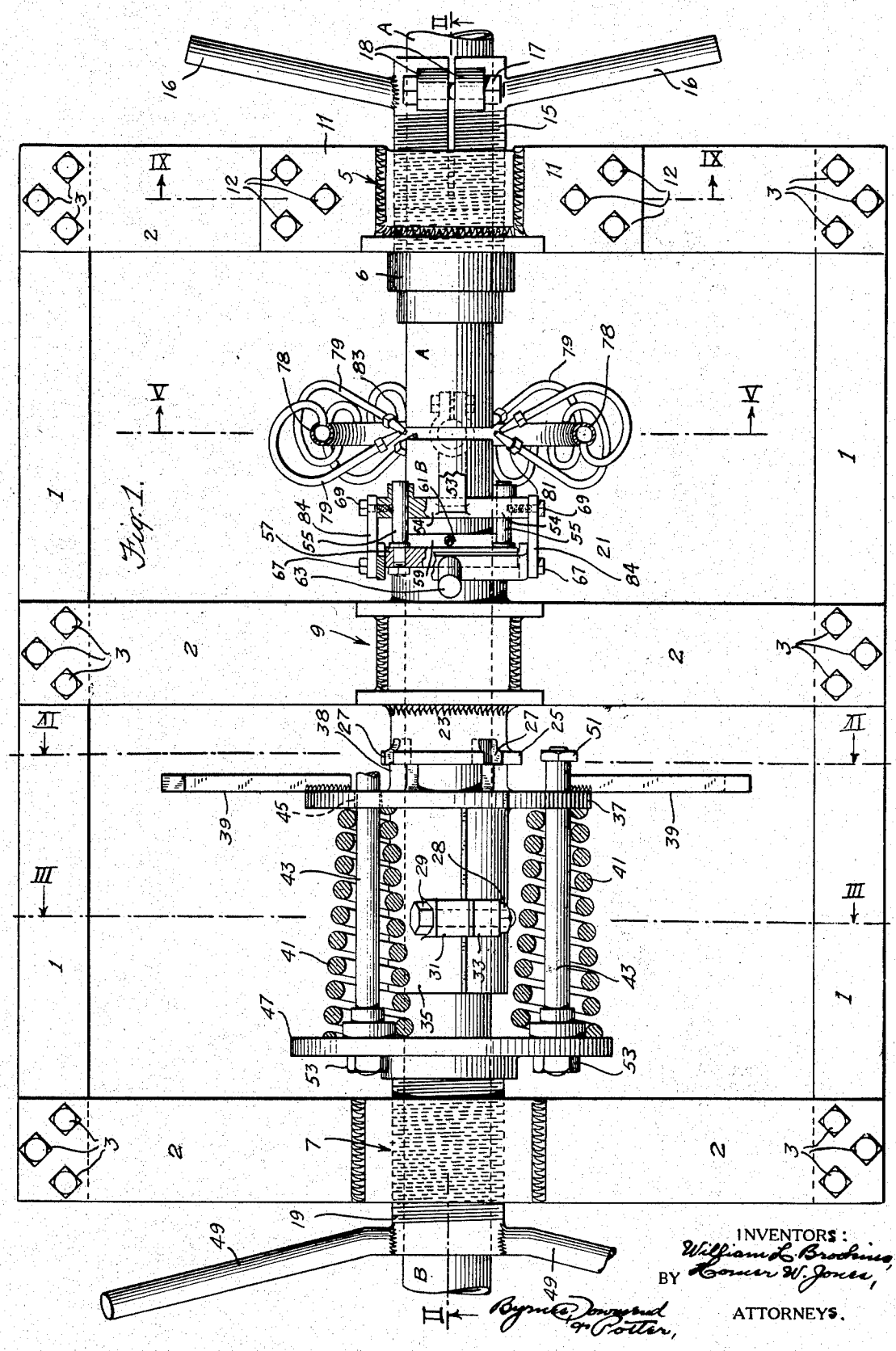
Figure 2:
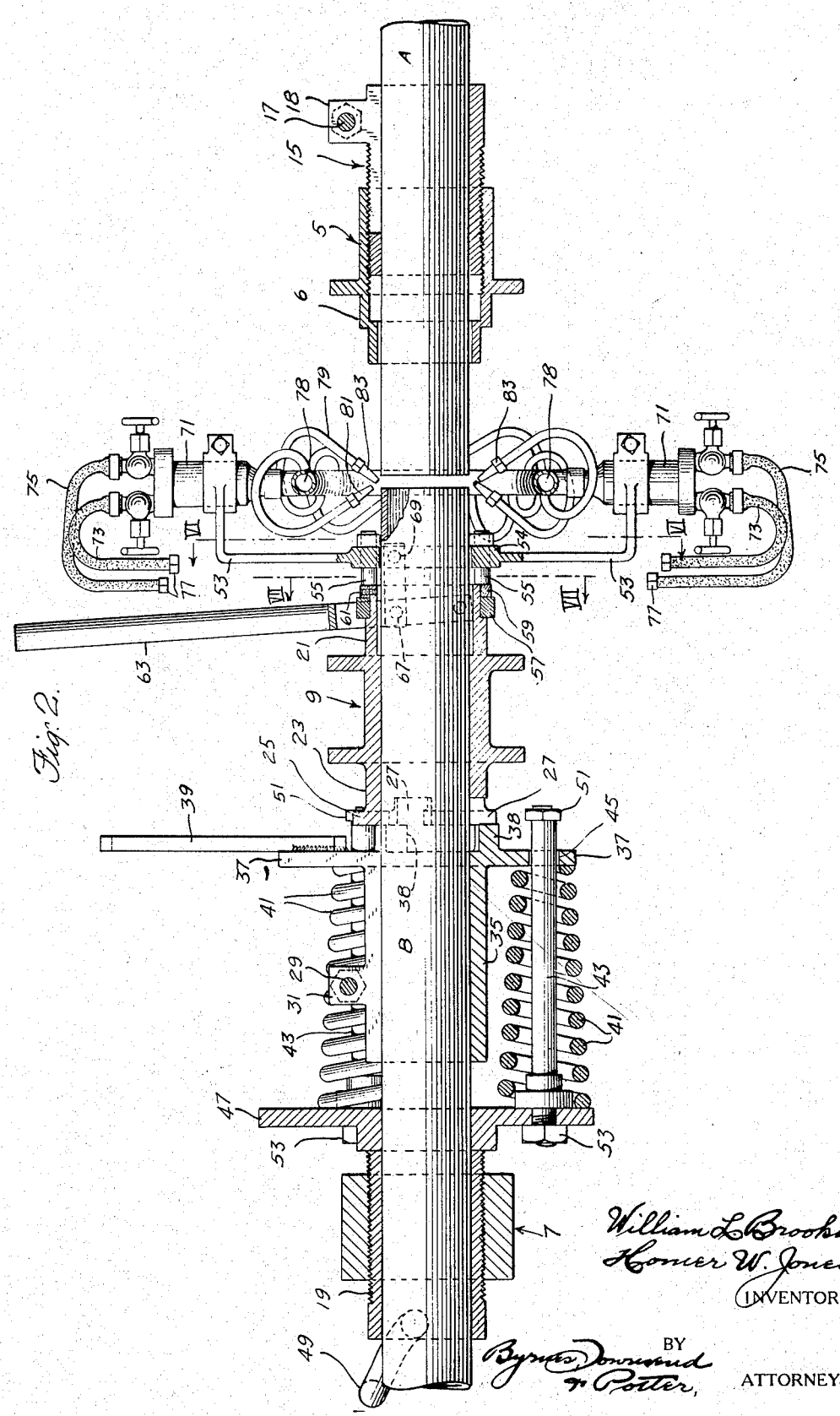
Figure 3:
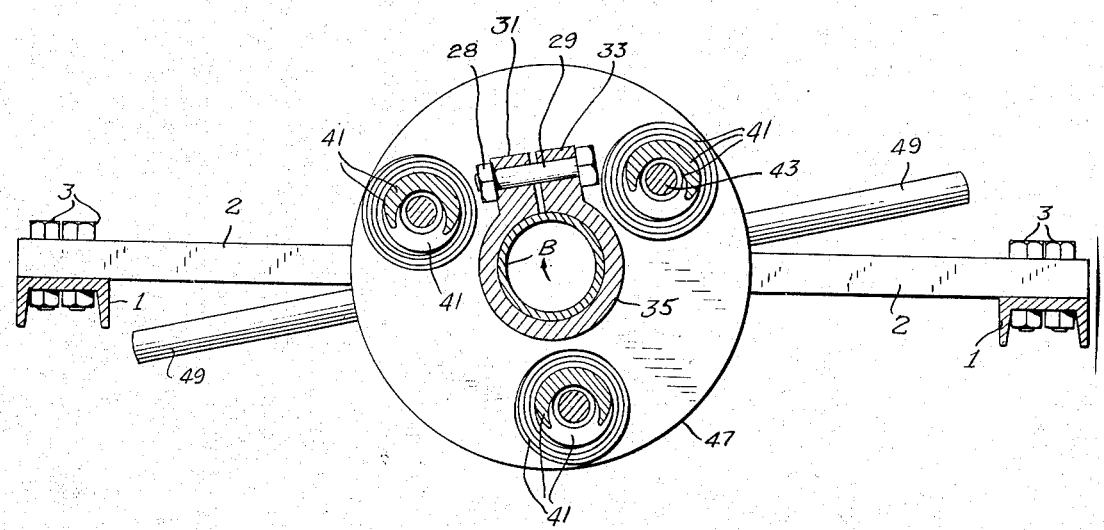
Figure 9:
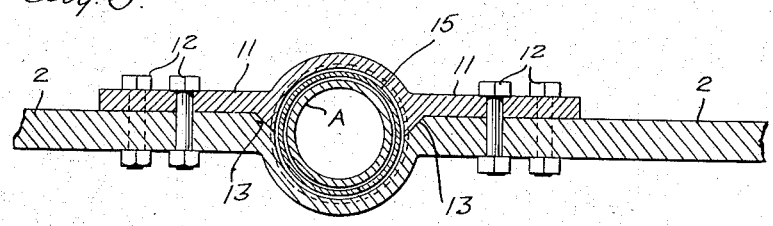
Figure 4:
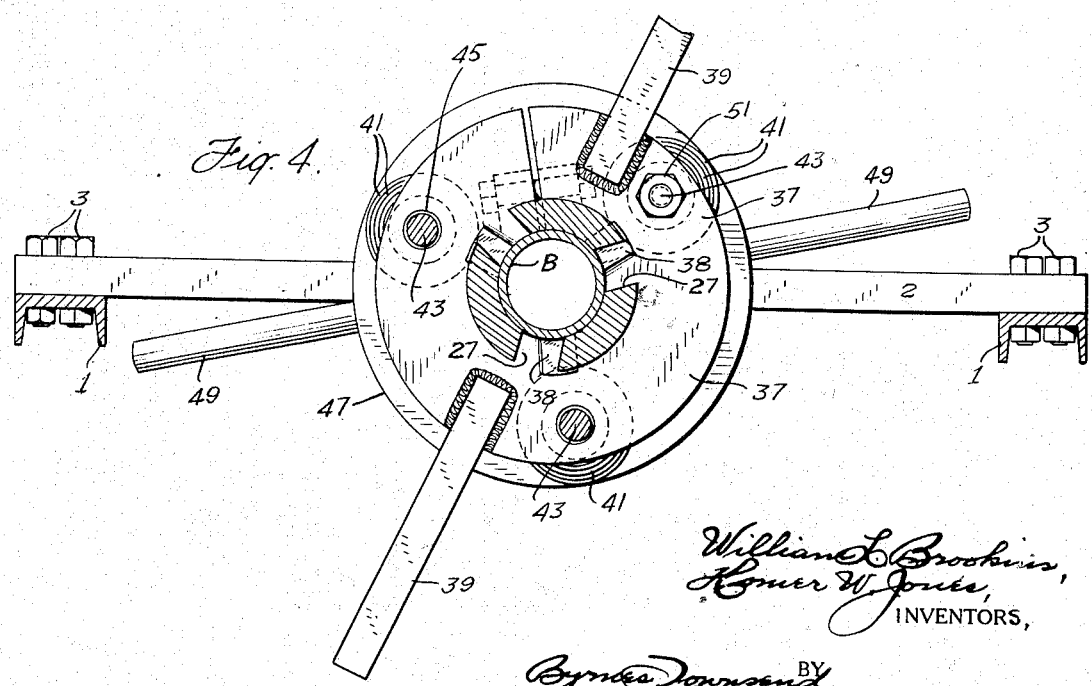

The invention will be more particularly described with reference to a welding machine for welding pipes of indefinite length which is shown in the drawings constituting a part hereof in which, Figure 1 is a top plan view of a pipe welding machine, Figure 2 is a longitudinal cross sectional view taken along the line II—II of Fig. 1, Figure 3 is a transverse cross sectional view taken along the line III—III of Fig. 1, Figure 4 is a cross sectional view taken along the line IV—IV of Fig. 1, Figure 5 is a cross sectional view taken along the line V—V of Fig. 1, Figure 6 is a sectional view taken along the line VI—VI of Fig. 2, Figure 7 is a transverse sectional view taken along the line VII—VII of Fig. 2, Figure 8 is a view showing the disposition of the torch tips with respect to the articles to be welded, and Figure 9 is a sectional view taken along the line IX—IX of Fig. 1.

The welding machine comprises side plates or beams 1 and cross plates or beams 2 which are secured together by bolts 3 to form a frame or support. End yokes 5 and 7 and an intermediate yoke 9 are rigidly mounted in alignment in the cross plates 2. The yoke 5 preferably consists of a lower half formed by welding a semi-circular collar in the cross beam 2 and an upper half formed by welding plates 11 on another semi-circular collar. The upper half of the yoke is secured to the cross plate by the bolts 12. The yoke is parted along the lines 13 which terminate on the inner circumference of the yoke at diametrically opposite points so that the plates 11 may be removed as a unit to lower the pipe into the yoke or to position the machine around a relatively fixed pipe A. The yoke 5 is internally threaded to receive a threaded partially split collar 15.

The inner bore of the collar 15 is given a slide fit over the pipe so as to align the fixed pipe in the machine. Handles 16 are provided to screw the split collar 15 into the collar 5 and a bolt 17 is passed through openings in the ears 18 on the split end of collar 15 to clamp the pipe in alignment in the collar. In addition to its function as an aligning and clamping member, the collar 15 serves as one bearing member over which the machine may be moved along a welded-on length of pipe to place the machine in position to weld on another section of pipe.

The end yoke 7 preferably consists of a collar which is welded into the end cross plate 2. The yoke 7 is internally threaded to carry a threaded collar 19 which is given a slide fit on the relatively movable pipe B. The collar 19 serves as an aligning member for the movable pipe and as a bearing member upon which the machine may be supported and moved along on a pipe or track.

The intermediate yoke 9 consists of a collar preferably welded in the intermediate cross plate 2. The inner bore of the yoke is given a slide fit over the pipe and it serves with yoke 7 as an aligning member for the relatively movable pipe B and as a supporting member to support the machine on the pipe. On one side of the yoke 9 is a cylindrical projecting collar 21 upon which a torch operating device may be mounted and on the other side a collar 23 projects. At or near the outer end of collar 23 is a flange 25 and 25 longitudinal spaced slots 27 are cut through the flange 25 and collar 23.

A movable clamp 35 for the movable pipe B consists of a split hub and flange. The clamp is held together by a nut 28 screwed down on the bolt 29 which bolt is passed through ears 31 and 33 on the adjacent portions of the clamp. An end flange or pressure ring 37 on the hub 35 is provided on its outer face with spaced projections or lugs 38 which are adapted to bear against the end flange 25 of the collar 23 and to slide into the slots 27 when the clamp is turned into a proper position by means of the handle 39 and to retain the pipe B and clamp in a withdrawn position when the clamp is turned into other positions.

Impact-producing forces sufficient to move the pipe B forward at a high velocity against the fixed pipe A and produce a sharp forcible hammer blow, are impressed on the pressure ring 37 while the ring and clamp are in the withdrawn position by compressing the coil springs 41. The springs 41 of which there are preferably three are spaced around the pressure ring 37 and supported on longitudinally movable rods 43 which are adapted to slide through openings 45 in the pressure ring 37. The rods 43 are passed through the coil spring 41 and are fixedly attached to a spring compressing ring 47 which has a central opening and is adapted to slide over the movable pipe B against the springs 41 when the collar 19 is screwed into yoke 7 by means of the handles 49. Nuts 51 or other convenient adjusting and retaining devices are screwed on the outer ends of the rods 43 to prevent withdrawing the rods through the openings 45 and to provide for any desired longitudinal adjustment of the pressure ring in the machine. Rods 43 are secured to the spring compressing ring 47 by the nuts 53 which are screwed down on opposite sides of the ring 47.

In preparation for welding, the frame and fixed pipe A are properly aligned and clamped in position by means of the guide 5 and by contracting the split end of the collar 15. The end of the relatively movable pipe B is preferably brought into contact with the end of the relatively fixed pipe A. The movable clamp 35 and plate 37 may, if desired, be withdrawn a short distance to provide for the shortening of the pipes when they are impacted and the movable pipe may then be clamped in the movable clamp 35. The movable clamp 35 and pipe B are then withdrawn into an inactive position by means of the handles 39 or by other desirable means and held in this position by turning the clamp and pressure ring 37 so as to cause the lugs to engage the flange 25 on the collar 23.

The backward movement of the clamp 35 and pipe B into an inactive position is regulated so that the ends of the pipes will be separated a predetermined distance to permit flames to be directed obliquely against the ends of the pipes, the distance being sufficient to permit the entrance of flames which are projected obliquely against the ends of the pipes from the plurality of annularly disposed torch tips which are arranged on a diameter greater than the outside diameter of the pipes.

The springs 41 are then compressed by screwing the collar 19 into the yoke 7 against the spring compressing plate 47. The plate 47 moves over the pipe against springs 41 and carries forward the rods 43 which slide through the openings in the pressure ring 37. A greater clearance is preferably provided for the forward longitudinal movement of the pressure ring 37 to its completely released position than for the backward longitudinal movement of the plate 37 into its locked inactive position. This is done so that the springs may be compressed to a point where they will prevent a rebound of the movable clamp after the pipes are impacted to produce a forcible pressing together of the ends after the impact, and so that the pipes may shorten slightly and form a burr when they are impacted.

An alternative method of positioning the pipes for welding may consist in positioning the pipes with their ends separated and in position to be welded with the pressure ring 37 in its inactive position, clamping the movable pipe and then compressing the springs 41, but other methods of procedure may be used.

When the ends of the pipes are heated to a welding temperature by a device hereinafter to be described, the pressure ring 37 is turned through an angle so that the lugs 38 slide into the slots 27 in the flange 25, throwing the movable clamp ring 37 and pipe B forward in a straight line at a high velocity and striking the ends of the pipes together with a forcible sharp hammer blow. The springs 41 are compressed to produce a sufficient impinging of the pipes to break and eject surface oxides from the heated metal and maintain a strong compression of the contacted ends of the pipes after impact to prevent a material backward movement or rebound of the pipe B. The impacting of the pipes may be accomplished without discontinuing the heating or disturbing the torches in any way since the torch tips, hereinafter to be described, are positioned on a circumference outside of the circumference of the pipes.

The torch operating device is preferably mounted on the collar 21 of the intermediate yoke 9 but it may be mounted on the collar 6 on yoke 5. The welding heat which consists of a plurality of torches with mixers for gas and oxygen or air are supported by arms 53. The arms 53 project from a central yoke 54 which has a central opening through which the pipe may be passed. The yoke 54 rests and slides longitudinally over four pins 55 which are secured to and project from a rotatable collar 57. The collar 57 is adapted to rotate on the collar 21 and is held from longitudinal movement by the collar 59 which is secured to the collar 21 by the set screws 61. The torch mounting and the collar 57 are rotated and the torch mounting is moved longitudinally by the lever 63 which is forked at its ends and pivoted on the collar 57. Links 84 pivoted on the forked end of the lever 63 and on the central yoke 54 by the pins 67 and 69 respectively carry the yoke 54 and the torch arms 53 longitudinally on the pins 55. In rotating the torches the lines of flexible gas and oxygen hose which conduct gases from sources of supply to the mixers 71 may be reeled around the collar 21 by means of rotatable collar 57.

The portions 73 of the oxygen supply pipes and the portions 75 of the gas pipes which are connected to the mixers 71 may consist of flexible or non-flexible metal or non-combustible material and extend along the arms 53 and flexible rubber hose conductors may be connected to nipples 77 near the rods 55 so that the flexible conductors will be guided onto the reeling space around the collar 21 when the torch support is rotated and so that the burning of the gas conductors from the heat of the torches will be avoided.

Any number of gas mixers 71 may be used but two mixers connected to semi-circular ring pipes or headers 78 are usually sufficient. The mixture of oxygen and gas which is mixed in the mixers 71 passes through the semi-circular ring pipes 78 and through the torches 79 which are mounted on the pipes 78.

One arrangement of the torches consists of alternative torches 79 with tips 81 to direct flames obliquely onto the end face of the fixed pipe A and alternate torches with tips 83 to direct flames obliquely onto the end face of the relatively movable pipe B. The tips 81 and 83 are desirably spaced regularly on a circumference somewhat larger than the pipes to be welded so that longitudinal movement of the torches does not interfere with the pipes. For welding pipes which are cut off on a plane substantially perpendicular to the axis of the pipes, an angle of about 50° between the flames has been found to be satisfactory, but the flames may be inclined at other angles. With this arrangement it is desirable to arrange the spacing of the ends of the pipes and the inclination of the flames so that the flames will impinge obliquely on the confronting faces of the pipes and reflect on opposing faces.

In making the weld the torch tips are moved longitudinally along the pipe by the handle 63 so that the tips are positioned about midway of the space at the ends of the pipes. The torches are then rotated on the bearing 21. About one complete revolution of the torches is desired to give uniform circumferential heating of the ends of the pipes. Two complete revolutions in one direction and a return to the initial position are generally preferred. If all of the torches are not adjusted to give the same degree of heating, the revolution of the torches equalizes the circumferential heating. If the combined heating of one set of flames is greater than the other set, the torches may be shifted slightly in a longitudinal direction but the best results are obtained when all of the torches are adjusted to give substantially the same degree of heat.

Another arrangement consists in disposing the tips circumferentially around the pipe so as to project the flames in a plane substantially perpendicular to the axis of the pipes and radially of the pipes. In making a weld with this arrangement, short distances at the ends of the pipes are uniformly heated about to a cherry red heat by revolving the tips around the pipes and simultaneously moving the tips back and forth longitudinally so that the flames impinge first on the outer surface of one pipe and then on the outer surface of the other pipe. The tips are then stationed to project the flames through the space between the pipes and again revolved. The spreading of the flames under these conditions heats the confronting faces of the pipes to welding temperatures in a manner such that substantially no burr is formed on the inside of the welded joint.

When the confronting ends of the pipes are heated to a welding temperature by either of the above described methods and then struck together or impacted with a sharp forcible hammer blow, the surface oxides are rejected from the heated portions, the ends of the pipes are welded together and a circumferential burr is formed around the outer circumference of the weld. It is believed that this action is a result of more intense heating of the inner circumferential layers of the metal than of the outer layers of metal but we do not specifically limit our invention to this theory of operation.

It is preferable, but not necessary, to continue the operation of the torches during the impacting of the pipes to make sure that the heating is continued at least until or during the moment of impact so that the welding may occur at least as soon as the metal has reached its welding temperature. At the welding heat, metals cool with great rapidity and it is often desirable not to heat the metals to temperatures in excess of the welding temperature. By maintaining the heating flames at least until or after welding, a high temperature envelope or zone of heated gas is maintained around the weld. This prevents the metal from cooling below the welding temperature during the short interval which might elapse if the flames were discontinued before the spring releasing devices were operated. It is evident that the heating may be discontinued at the moment of impact. However the increase in temperature of the metal may be continued after the weld is formed.

The machine is especially well adapted to weld pipes which have end faces perpendicular or substantially perpendicular to the axes of the pipes. We prefer to regulate the heating so that the pipes will burr outwardly when they strike together. It is desirable to have the ends of the pipes heated to a welding temperature throughout. If the outside rim of metal is not completely welded, the extent of the defect is apparent to the eye and defective welds may be identified by visual inspection. After the pipes are impacted, the burr is fused down and small deficiencies in welding may be overcome by the melting down of the external circumferential burr. The fusing of the burr serves to homogenize the external layers of metal, strengthen the weld, smooth the weld and obliterate small fissures or defects in the external layers of metal around the joined ends of the pipes.

The heating may desirably be continued during the impacting of the pipes and after the weld is formed in order to utilize the heat in the pipes as an aid to the flames in melting down the burr, but it is also evident that the heat may be turned off after the weld is formed or at the moment of impact and again established before or after the weld has cooled. If the flames are extinguished they can be conveniently re-established by turning on the gas while the metal is red hot. Either before or after the burr is fused-down the flames may be manipulated to anneal the weld by intermittently turning on the flames or by lowering the flames so that they will not fuse the metal.

When the weld is completed the clamps may be loosened and the machine may be slipped along the pipe B on the yokes 5, 7, and 9 until it occupies a position on the exterior end of pipe B corresponding to the position shown on the relatively fixed pipe A as described above.

It is evident that the yokes 7 and 9 may be made in two parts like yoke 5, or that yoke 5 can be made in one piece like yoke 7. It is also evident that the machine can be used for bending pipe. It is customary in bending to heat the pipe red hot along one side. For this purpose we may use only the torches which are mounted on one of the halves of the burner ring and move the burner ring longitudinally along the pipe with with a small reciprocating movement to give the desired heated area. The heated portion of the pipe may then be made to project beyond the end yoke and the projecting end of the pipe may be bent around, using the machine as an anchor. Other modifications of the described embodiment may be made without departing from the invention. We wish to limit our invention only by the prior art and by the annexed claims.

We claim:

1. A welding machine comprising a frame, means to hold the frame fixedly on a relatively fixed object, a clamp supported by the frame and relatively movable with respect thereto, means for holding said clamp in a retained position, means for storing impact-producing energy on the clamp while it is held in a retained position, and means to release said clamp from said holding means.

2. A welding machine comprising a frame, means to hold the frame fixedly on a relatively fixed object, a clamp supported by the frame and relatively movable with respect thereto into a released and a retained position, means for holding said clamp in said retained position means for storing impact-producing energy in said clamp including means for producing forces acting circumferentially and directly on the clamp while it remains in the retained position, and means to release said clamp from said holding means.

3. A welding machine comprising a frame, means to fix an object and the frame in predetermined alignment, means to clamp another object in said alignment in the frame, said clamping means including means to move said other object back and forth, heating means connected to flexible conductors, a support for said heating means, means to revolve said support and heating means, and means disposed adjacent to said revolving means upon which said conductors are wound when the support is revolved.

4. A welding machine comprising a frame, means fixedly secured to the frame to longitudinally secure the frame in axial alignment with a relatively fixed object, a longitudinally movable clamp to grip a relatively movable object in end to end contact with the fixed object, means to withdraw and retain the movable clamp with the object gripped therein into a predetermined inactive position, means for storing impact-producing energy on the clamp while the movable object is withdrawn, means for producing forces acting on said storing means to produce said energy means to release said clamp.

5. A welding machine comprising a frame, means fixedly secured to the frame to longitudinally secure the frame in axial alignment with a relatively fixed object, a longitudinally movable clamp to grip a relatively movable object in end to end contact with the fixed object, means to withdraw and retain the movable clamp with the object gripped therein into a predetermined inactive position, means on said movable clamp for storing impact-producing energy, movable means independent of the movement of said clamps to produce forces acting on said storing means and producing said energy while the clamp is withdrawn, and means to release said clamp.

6. A welding machine comprising a frame, bearing means adapted to support the frame for moving it on a relatively fixed elongated object, said bearing having means to rigidly secure the frame and a relatively fixed object in longitudinal alignment, a guide on the frame in axial alignment with said bearing means adapted to support the frame and to align a relatively movable object with said fixed object, a longitudinally movable clamp adapted to grip the movable object and withdraw the object into an inactive position, means to retain the clamp in said position, means for storing impact-producing energy in said clamp while in the retained position and means for releasing said energy to produce an impact force in said clamp to impact the movable object against the fixed object when welding thereto.

7. A welding machine comprising a frame, bearing means adapted to support the frame for moving it on a relatively fixed elongated object, said bearing having means to rigidly secure the frame and a relatively fixed object in longitudinal alignment, a guide on the frame in axial alignment with said bearing means adapted to support the frame and to align a relatively movable object with said fixed object, a longitudinally movable clamp adapted to grip the movable object and withdraw the object into an inactive position, means to retain the clamp in said position, and means adapted to react on the frame for storing impact-producing energy in said clamp while in the retained position and means for releasing said energy to produce an impact force in said clamp to impact the movable object against the fixed object when welding thereto.

8. A machine for butt welding objects which comprises a frame, means to direct heat on the end faces of the objects before they are welded and to direct heat on the weld, a guiding and clamping means to fixedly secure a relatively fixed object with its end adjacent said heating means and in longitudinal alignment in the frame, a longitudinally movable clamp to grip a relatively movable object in line with and with its end in contact with the fixed object, means for spacing the clamped objects a predetermined distance, means for storing impact-producing energy on the movable clamp while the objects are spaced and means for releasing said energy to impact the heated ends before said heating is discontinued.

9. A machine for butt welding objects which comprises a frame, means to heat the ends of the objects to be welded, a guiding and clamping means to fixedly secure a relatively fixed object with its end adjacent said heating means, a longitudinally movable clamp to guide and grip a relatively movable object in line with and with its end in contact with the fixed object, means for spacing the ends of the clamped objects a predetermined distance, means for storing impact-producing energy on the movable clamp while the ends of the objects are being heated, means to retain and release said clamp.

10. A machine for butt welding objects which comprises a frame, means to heat the ends of the objects to be welded, a guiding and clamping means to fixedly secure a relatively fixed object with its end adjacent said heating means, a longitudinally movable clamp to guide and grip a relatively movable object in line with and with its end in contact with the fixed object, means for spacing the ends of the clamped objects a predetermined distance, means for storing impact-producing energy on the movable clamp while the ends of the objects are being heated, and means to produce longitudinal and circumferential movement of the heating means.

11. A machine for butt welding objects which comprises a frame, means to heat the ends of objects to be welded, a guiding and clamping means to fixedly secure a relatively fixed object with its end adjacent said heating means, a longitudinally movable clamp to guide and grip a relatively movable object in line with and with its end in contact with the fixed object, means for spacing the ends of the clamped objects a predetermined distance, means for storing impact-producing energy on the movable clamp while the ends of the objects are being heated, and means for simultaneously releasing said clamp and said energy to impact the heated ends of the objects while said heating means is operative.

12. A welding machine comprising a frame, means for aligning two objects to be welded in said frame, means for spacing an end of one object from the adjacent end of the other object, means for retaining said objects in said spaced relation to each other, means for storing impact-producing energy on at least one of said objects, and means for releasing from said retaining means said object having impact-producing energy stored thereon, said releasing means adapted also to release said stored energy.

13. A welding machine comprising a frame, means for aligning two objects to be welded in said frame, means for spacing an end of one object from the adjacent end of the other object, means for retaining said objects in said spaced relation to each other, means for storing impact-producing energy on at least one of said objects, means for releasing from said retaining means said object having impact-producing energy stored thereon to force said object toward the other object, and means for heating the adjacent surfaces to be welded while the surfaces are in spaced relation to each other and during the movement of said released object.

14. A pipe butt welding machine comprising a frame, means for fixing a pipe against movement in said frame, means for guiding a movable pipe axially in respect to said fixed pipe, means for heating to a welding temperature the adjacent ends of said fixed and movable pipe, and means for impacting the heated end of the movable pipe against the adjacent heated end of the fixed pipe.

15. A portable pipe welding machine comprising a frame, means attached to said frame for securing said frame in longitudinal alignment to a stationary pipe, means attached to said frame for aligning a movable pipe with said stationary pipe, said means for akgning said movable pipe having slidable engagement with said movable pipe, means for gripping said movable pipe, means carried by said frame for fusing the adjacent ends of the stationary and movable pipe, and means carried by said frame and cooperating with said movable pipe gripping means for feeding the movable pipe toward the stationary pipe during the fusing operation, said feeding means having means for impacting the ends of the pipes to be welded after the ends have been raised to a welding temperature.

16. A portable apparatus for fusing together the ends of pipe line sections including a welding head frame, means for securing the same to a stationary pipe line section, an aligning frame having surfaces therein for slidably engaging the exterior of a movable pipe section, means for tying together the welding head frame and the pipe-aligning frame, means for gripping the movable pipe line section projecting into the aligning frame, means carried by the welding head frame for fusing the meeting ends of the pipe line sections, and cooperating means on the aligning frame and the section gripping means for feeding the movable section toward the stationary section during the fusion operation, said feeding means having means for impacting the ends of the pipes to be welded after the ends have been raised to a welding temperature.

17. A welding machine comprising means to align a relatively fixed pipe and a relatively movable pipe in end to end contact, means to rigidly fix the machine to the fixed pipe, a longitudinally movable clamping ring having means to clamp the same to the movable pipe, means to withdraw the ring and movable pipe a predetermined distance, means to store impact-producing forces on the ring in said withdrawn position, and means to release the forces.

18. A welding machine comprising a frame, means to hold the frame fixedly on a relatively fixed object, a clamp supported by the frame and relatively movable with respect thereto into a released and a retained position, means for holding said clamp in said retained position, an abutment on said frame, springs interposed between said clamp and said abutment on said frame, means to compress said springs against said clamp while said clamp is in its retained position, and means to release said clamp from said holding means.

19. A portable apparatus for fusing together the ends of pipe line sections including a member for attachment to one section of a pipe line, a clamp for attachment to another section, a separable alining frame interposed between said member and the clamp for encircling and guiding the pipe section engaged by the clamp, means extending from said member for holding the alining frame fixed relative thereto, a welding head for encircling one pipe line section and supported between said member and the alining frame for fusing the meeting ends of the pipe sections, said welding head being rotatably mounted relative to the member, and means connecting the clamp and the alining frame for feeding one of the pipe sections toward the other during the fusing operations, said feeding means having means for impacting the ends of the pipes to be welded after the ends have been raised to a welding temperature.

20. A welding machine comprising means to align and fix therein a relatively fixed pipe and a relatively movable pipe in spaced apart confronting relation, rotatable heaters adapted to direct heat obliquely on the confronting ends, means to store impact-producing energy on the clamping means for said movable pipe, and means to release said energy to produce forces to impact the pipes while said heaters are in operation.

21. A welding machine comprising means, including a clamping device, to space articles to be welded in predetermined opposed relation; means to apply heat to the opposed faces of said articles; means to impress impact-producing forces on said device when said articles are apart; and means adapted to release said forces to impact said articles before the application of heat is interrupted.

WILLIAM L. BROOKINS.
HOMER W. JONES.